United States Patent [19]
Von Pfeil et al.

[11] Patent Number: 6,035,033
[45] Date of Patent: Mar. 7, 2000

[54] METHOD AND APPARATUS FOR LIMITING RESIDUAL ECHO IN A SPEECH SIGNAL-CARRYING CHANNEL OR LINE

[75] Inventors: Dirsko Von Pfeil, Hohenschaeftlarn; Erhard Waretzi, Haar, both of Germany

[73] Assignee: Siemens Aktiengesellschaft, Munich, Germany

[21] Appl. No.: 08/938,887

[22] Filed: Sep. 26, 1997

[30] Foreign Application Priority Data

Sep. 26, 1996 [DE] Germany .................. 196 39 702

[51] Int. Cl.⁷ .................................................. H04M 9/08
[52] U.S. Cl. .................. 379/406; 379/410; 379/411; 370/289
[58] Field of Search .................. 379/406, 408, 379/409, 410, 411, 345, 407, 388, 389; 370/288, 289, 286; 708/322; 381/71.12; 706/201, 211

[56] References Cited

U.S. PATENT DOCUMENTS

| | | |
|---|---|---|
| 4,645,883 | 2/1987 | Horna et al. .................. 379/406 |
| 4,679,230 | 7/1987 | Lassaux et al. .................. 379/411 |
| 4,894,820 | 1/1990 | Miyamoto et al. .................. 379/410 |
| 4,912,758 | 3/1990 | Arbel .................. 379/388 |
| 5,193,112 | 3/1993 | Sano .................. 379/410 |
| 5,278,900 | 1/1994 | Van Gerwen et al. .................. 379/411 |
| 5,390,250 | 2/1995 | Jense et al. .................. 379/409 |
| 5,396,488 | 3/1995 | Lahdemaki .................. 379/409 |
| 5,477,535 | 12/1995 | Lahdemaki .................. 379/409 |
| 5,479,502 | 12/1995 | Ohga et al. .................. 379/389 |
| 5,561,668 | 10/1996 | Genter .................. 379/409 |
| 5,563,944 | 10/1996 | Hasegawa .................. 379/410 |
| 5,587,998 | 12/1996 | Velardo, Jr. et al. .................. 379/409 |
| 5,606,550 | 2/1997 | Jangi .................. 379/411 |
| 5,852,661 | 12/1998 | Chen .................. 379/406 |

FOREIGN PATENT DOCUMENTS

| | | |
|---|---|---|
| 0 384 490 | 8/1990 | European Pat. Off. . |
| 0 508 847 | 10/1992 | European Pat. Off. . |
| 0 604 948 | 7/1994 | European Pat. Off. . |
| O 41 35 790 | 5/1993 | Germany . |
| 2 240 452 | 7/1991 | United Kingdom . |
| WO 96/02981 | 2/1996 | WIPO . |

*Primary Examiner*—Forester W. Isen
*Assistant Examiner*—Jacques M. Saint-Surin
*Attorney, Agent, or Firm*—Hill & Simpson

[57] ABSTRACT

In a method and arrangement for limiting residual echo in a speech signal-carrying line or channel, the echo signal is largely compensated by means of a correction signal. By means of a residual echo limiter, the transmission of the echo signal is prevented. The filter coefficients of the correlators are monitored for changes. This ensues by monitoring the absolute values of auxiliary correlators in comparators. If a change is determined, the time constants of a measurement means are changed over for the calculation of the residual echo, so that an adaptation to changed connection characteristics ensues rapidly, and the residual echo limiter again operates in an optimal manner.

16 Claims, 3 Drawing Sheets

METHOD AND APPARATUS FOR LIMITING RESIDUAL ECHO IN A SPEECH SIGNAL-CARRYING CHANNEL OR LINE

BACKGROUND OF THE INVENTION

1. Field of the Invention

The present invention is directed to a method for limiting residual echo in a speech signal-carrying channel or line, as well as to an apparatus for implementing the method.

2. Description of the Prior Art

Generally, echo cancelling circuits for speech signals contain a residual echo limiter, designated with the abbreviation NLP (non-linear process). This circuit part is activated only when there is no duplex speech, and thus only the disturbing residual echo signal is transmitted to the speaking subscriber at the remote end of the channel or line. If the proximate-end subscriber is speaking, or both subscribers are speaking at once, the NLP is suppressed. In contrast, an activated NLP blocks the echo, which cannot be further compensated, and which is caused by non-linearities in the echo path, or also by PCM coding.

A method of this type is discussed in German OS 41 35 790. A control stage connects signals through to the transmission output if at that time they are still above the level of the residual echo signal. The residual echo limiter is in effect only when the remote-end subscriber is also speaking, but is never in effect during duplex speech. In order to recognize with maximum precision the times in which only the remote-end subscriber is speaking, monitoring of the incoming and outgoing signals by means of level and attenuation measurements is required. Since speech comprises considerable fluctuations in loudness level, the measurement means must contain integration elements. With increasing integration time, the precision of the measurement also increases. On the other hand, the measurement values are supposed to rapidly follow change in the echo path. A compromise is thus required.

SUMMARY OF THE INVENTION

An object of the present invention is to provide a method and an apparatus for limiting residual echo in a speech signal-carrying channel or line which fulfill both of the above criteria, i.e., precision and rapid recognition of changes in the echo path, in an optimal manner.

The above object is achieved in accordance with the principles of the present invention in a method and apparatus for limiting residual echo in a speech signal-carrying channel or line wherein the echo signal of a subscriber is substantially compensated by the use of a correction signal produced using a filter having filter coefficients which are controlled and wherein, using filter elements, a control signal is produced for actuation of the residual echo limiter, with the residual echo signal or the echo signal being continuously monitored and wherein, given a change in the monitored signal, the time constants of the filter elements are temporarily made smaller.

A particular advantage of the inventive method and apparatus is the use of a suitable criterion that very rapidly recognizes changes in the echo path, as well as the conversion of the time constants of the integration elements by means of this criterion. The criterion is the change of one of the filter coefficients. It is particularly advantageous if, in addition to the aforementioned correlators, auxiliary correlators are also provided that increase strongly when changes occur.

A conversion of the measured signals into logarithmic signals is advantageous, because attenuations can then be calculated by means of simple subtraction of signals (levels).

The circuits or computing procedures can be simplified if binary signals are produced that are realized in counters or as part of a computing circuit.

In order to avoid disturbances due to frequent switching of the NLP, it is advantageous to introduce a lag time of several ms (120 ms), after the NLP has connected through. In this way, it is ensured that softer speech portions are also transmitted. In place of the lag time, hysteresis can also be provided in the integrator or in a comparator connected following the integrator. The control criterion for the NLP can also be employed or co-employed to control the echo compensator. This controlling can also be based on the same principles, but calculated with "softer" input criteria.

DESCRIPTION OF THE PREFERRED EMBODIMENTS

Figure 1:
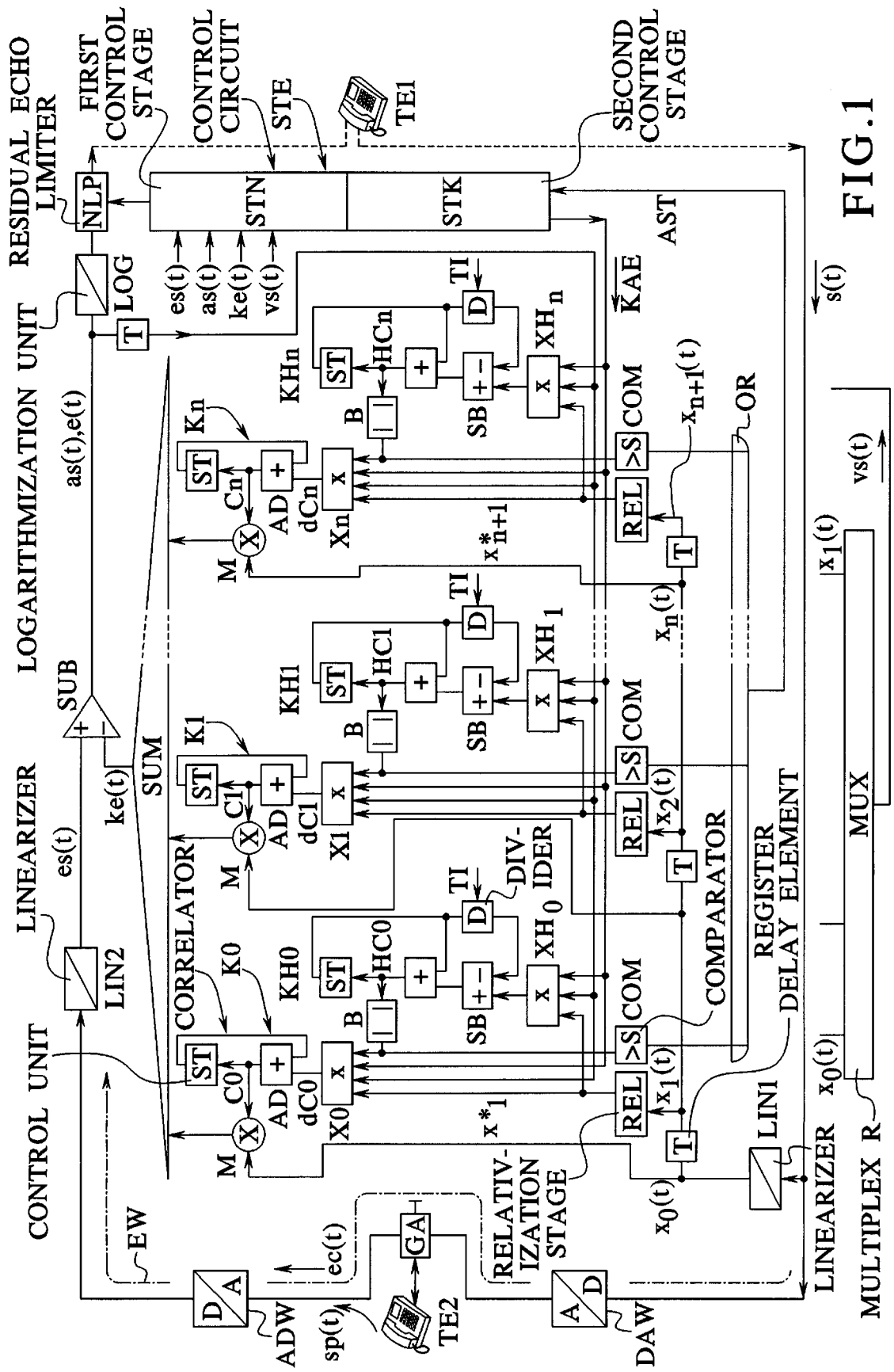
FIG. 1 is a schematic diagram of an echo compensator constructed and operating in accordance with the principles of the present invention.

FIG. 1 shows an exemplary embodiment of an inventive echo compensator, containing, in addition to known correlators K0 to Kn for adjusting the filter coefficients, auxiliary correlators KH0 to KHn allocated thereto.

The echo compensator shown is constructed for PCM-coded signals. The telephone connection between a first subscriber TE1 and a second "near-end" subscriber TE2 has a transit time (delay) of a duration such that the transmission signal s(t) produced by the first subscriber TE1 is noticeable as a disturbing echo signal ec(t) over the echo path EW, due to the insufficient decoupling of the transmission and reception paths. The long transit time can be caused by the path, e.g. satellite connections or a very long cable, but also by coding of the signals, used, for example reduction of the bitrate or for error correction. For the second subscriber TE2, the digital signal s(t) is converted into an analog signal in the digital-analog converter DAW. The echo signal ec(t), which arises in particular in the termination hybrid, is added to the speech signal sp(t) of the subscriber and is converted into the sum signal es(t) in the analog-digital converter ADW.

The echo compensator has a delay chain formed by registers T, which chain, together with the multipliers M and the summation unit SUM, forms a transverse filter. The transmission signal s(t), converted into linear signal values $x_0(t)$, $x_1(t)$, $x_2(t)$, $x_2(t)$, . . . , $x_n(t)$, is supplied to this filter. The registers operate with the clock pulse of the transmitted data words, or sampled values.

Since compressed PCM-coded data are transmitted, it is useful first to convert these data back into linear data. This takes place in a linearizer LIN1.

A corresponding linearizer LIN2 and logarithmization unit LOG are used in the other direction of transmission.

A relativization stage REL, of a type known in the art, is connected before the correlators K0 to Kn. The relativization stage REL relates the current amplitude values to the preceding ones, thus compensating amplitude differences corresponding to the loudness level. A standardization thus takes place to some extent.

For the description of the manner of operation, it is first assumed that no crosstalk ensues, i.e. no speech signal sp(t) of the first subscriber is added to the echo signal.

Using the transverse filter, the echo equalizer produces a correction signal ke(t), which emulates the echo signal ec(t) as precisely as possible and is subtracted from this echo signal. The remaining error signal e(t) controls the correlators, which consist respectively of a simple multiplier X0, X1, . . . and a summation circuit formed from a memory ST and a summation unit AD.

Each correlator calculates a filter coefficient C0, C1, . . . , by which the transmission signal s(t) is multiplied in one of the multipliers M, after conversion into a relativized transmission signal $x^*_0, \ldots, x^*_{n+1}$ and being delayed in the delay elements T (registers) of the transverse filter. The relativized signal largely equalizes differences in the loudness/amplitude. Another matching of the orders of magnitude of the summed value and to the required filter coefficients is often required. The differently delayed signal portions emitted by the multipliers M are combined in the summation unit SUM to form the correction signal ke(t).

In a subtractor SUB, this signal is subtracted from the echo signal, or from an input signal es(t).

An auxiliary correlator KH0 to KHn is allocated to each correlator. The same input values are supplied to the multipliers XH0, XH1, . . . , thereof; however, the stored auxiliary coefficient is periodically reduced by the occurrence of a clock pulse (time spacing e.g. 4 ms). This function is realized by a divider D and a subtractor SB. In case of a missing and/or uncorrelated signal, the auxiliary coefficient is thus altered in a direction toward zero. The absolute value of the auxiliary coefficient HC0, HC1, . . . (obtained in the absolute value formation unit B) respectively control the allocated multiplier X0, X1, . . . of the associated correlator K0, K1, . . . in such a way that, given a small absolute value of the auxiliary coefficients HC0, HC1, . . . , the product dC0, dC1, . . . of the relativized transmission signal $x^*_{01}, \ldots, x^*_{n+1}$ and the error signal e(t) is additionally evaluated with a small factor, while, given large values of the auxiliary coefficient, a correspondingly larger factor is used. As a result, the respective correlation products dC0, dC1, . . . are dependent on the auxiliary coefficient.

In addition, it should be noted that it can be sufficient to use only the sign bit of the error signal, or a relativized error signal and the highest-valued bits of the auxiliary coefficient, as input signals for the control circuit. Likewise, it is often sufficient to use e.g. the three highest-valued bits of the relativized signal (these are three highest-valued changing bits of the linear signal).

By means of the control process, all filter coefficients are adjusted so that a minimal error signal e(t) results. As far as possible, the control process is carried out only when no duplex speech is taking place.

In case of duplex speech, the speech signal sp(t) of the second subscriber TE2 is additionally superimposed on the undesired echo signal ec(t), and, after subtraction of the correction signal ke(t), the "transmission path output signal" as(t) is transmitted to the first subscriber TE1.

The control process is made more difficult by duplex speech. A control circuit STE thus is employed for interrupting the control process in the case of duplex speech.

The indicated schematic diagram can be simplified in terms of circuitry in its realization if parts of the multipliers of the correlators and auxiliary correlators are used in common, operate in time-division multiplex operation, or are realized as parts of an arithmetic-logic unit.

If it is assumed that at first the filter and auxiliary coefficients are zero and correlated signals are present at a correlator and at the associated auxiliary correlator, then at first the auxiliary correlator increases rapidly, while the filter coefficient climbs only very slowly. As the absolute value of the auxiliary coefficient becomes greater, the filter coefficient increases more steeply at first, and then reaches its final value slowly, due to the equalization process.

Since the auxiliary coefficient is now continuously reduced, its value decreases slowly until it reaches zero.

In the exemplary embodiment, this is achieved in non-linear fashion in that its value is divided by a constant factor (e.g. 64), and is subtracted in a subtractor SB.

If the value of the auxiliary coefficient has again become very small, then disturbances due to unrecognized duplex speech or a loud environment of the first subscriber have only very small effects on the filter coefficients.

In this manner, the circuit again becomes insensitive to disturbing signals, and the control behavior is extremely stable. In order to be able to react rapidly and reliably to changes in a connection, the signals are monitored. A change in the connection characteristics causes a change in the filter coefficients. These coefficients are thus monitored directly or indirectly in order to obtain a suitable criterion for switching time constants.

For this purpose, comparators COM are provided that compare the auxiliary coefficients with threshold values "S." The outputs of the comparators are connected with inputs of an OR gate OR, whose output signal is connected through to a control unit STE.

A multiplexer MX connects through one of the delayed signals $x_0(t), x_1(t), \ldots$ or $x_{n+1}(t)$ to the control unit STE (FIG. 2) for the NLP as a delayed signal vs(t), and a signal se(t) is also supplied to this control unit STE from the transmission path input, as are a signal sa(t) from the transmission path output and the correction signal ke(t).

In the control unit STE, the levels of the applied signals are checked and attenuation calculations are carried out. A first control stage STN (FIG. 2) obtains criteria from the applied signals for controlling the NLP. In this exemplary embodiment, a second control stage STK controls the use of the correlators and auxiliary correlators by means of a signal KEA.

As is specified in detail in German OS 41 35 790, the control unit STE is supplied with the delayed signal vs(t) that is the most strongly correlated with the echo signal. For the selection of the optimally delayed signal, within the time interval of two successive sampled values (125 $\mu$s), first all n coefficients $C_0 \ldots C_n$ are (sequentially) compared with each other. The signal $x_1(t), x_2(t), \ldots, x_n(t)$ allocated to the largest coefficient is connected through via the multiplexer MUX.

Before describing further details of the circuit, first the principle of the method will be explained. The residual echo signal is determined from the measured signals, and is compared with the real signal as(t) at the output of the transmission path. If the signal at the transmission path output is greater, then subscriber TE1 is speaking, and his or her speech signal must be connected through to output A.

In order to determine the residual echo signal, the signals of the transmission path input and the transmission path output es(t) and as(t), the correction signal ke(t) and the delayed signal vs(t) are first supplied respectively to an absolute value formation units BE1 to BE4. This is indicated in the schematic diagram in FIG. 2 by means of rectifiers. The signals are then filtered in respective low-pass filters TP1 to TP4 in order to obtain stable values. The calculation of the residual echo signal follows subsequently. In order to be able to conduct the processing without multiplications or divisions, the signals are first converted into logarithmic signals in code converters CU1 to CU4, which logarithmic signals are then subtracted from one another.

The echo damping $A_{ECHO}$ is calculated by forming the ratio of the delayed signal to the echo signal, or is obtained by subtraction after the conversion into logarithmic quantities P.

$$P_{vs}-P_{es}=A_{ECHO}, \text{ if } es(t)=ec(t) \quad (1)$$

otherwise, $$P_{vs}-P_{as}=A_{ECHO}+A_{CANC}, \text{ if } es(t)=ec(t), \quad (2)$$

wherein $A_{CANC}$ is the compensator attenuation that indicates the effectiveness of the artificial echo signal ke(t). By means of the subtraction of the two equations $$(A_{ECHO}+A_{CANC})-A_{ECHO}=A_{CANC} \quad (3)$$

the attenuation of the compensator is determined.

If, for the calculation of the residual echo level, the correction signal ke(t) corresponding to an artificial echo is used in place of the real echo signal, there results $$P_{ke}-A_{CANC}=P_{re} \quad (4)$$

The result is the calculated level of the residual echo signal. By means of the linearizer LIN, the voltage of the residual echo, increased by a safety reserve, is supplied to a comparator COM as a threshold voltage $S_{re}$, and is compared with the likewise linear signal as(t). The comparator COM compares the threshold voltage calculated in this way with the signal as(t) of the transmission path output SA. As soon as the comparison voltage is exceeded by the voltage as(t) on the transmission path SA, the NLP is switched so as to be ineffective (suppressed), i.e., a switch is closed. A lag time of several ms (e.g. 120 ms) is provided, which prevents the switch from being opened again immediately if the comparison threshold is undershot. In this way, it is ensured that even softer speech portions of the subscriber TE2 are transmitted in an unimpeded manner. The lag time can be produced by a retriggerable monostable flip-flop KM.

The above considerations hold, however, only when the subscriber TE1 is speaking and the "proximate-end" subscriber TE2 is silent (es(t)=ec(t)). As a consequence, as far as can be recognized, the measurement is only enabled when the "remote-end" subscriber TE1 is speaking. For this reason, attenuation measurements are also carried out under these conditions for controlling the NLP. In addition, it is assumed that the times are relatively short in which it cannot be recognized with certainty that duplex telephony is occurring and excessively small attenuation values may be erroneously measured. The faulty measurements taking place during these time segments are smoothed by means of integration elements.

Integration elements IN1, IN2 are required that smooth the results of the subtractions.

The corresponding conditions are:

a) $P_{vs}>-39$ dBm0 as a criterion that the "remote-end" subscriber TE1 is speaking, and b) $P_{vs}>P_{es}+4$ dB as a criterion that the "proximate-end" subscriber TE2 is not speaking.

A safety margin significantly greater than 4 dB is not possible, because the echo damping in the unfavorable case can amount only to 6 dB.

At the same time, in the realization of the circuit specified below, the following must hold due to the limited resolution capacity of the circuit:

c) $P_{vs}>A_{ECHO}$, or $P_{vs}>A_{ECHO}+A_{CANC}$, because an attenuation measurement can ensue only when the first subscriber TE1 speaks at a level that is higher than the smallest detectable level, $P_{es}$ or $P_{as}$ in addition to the attenuation.

The results are integrated and are once again subtracted from one another.

Figure 3:
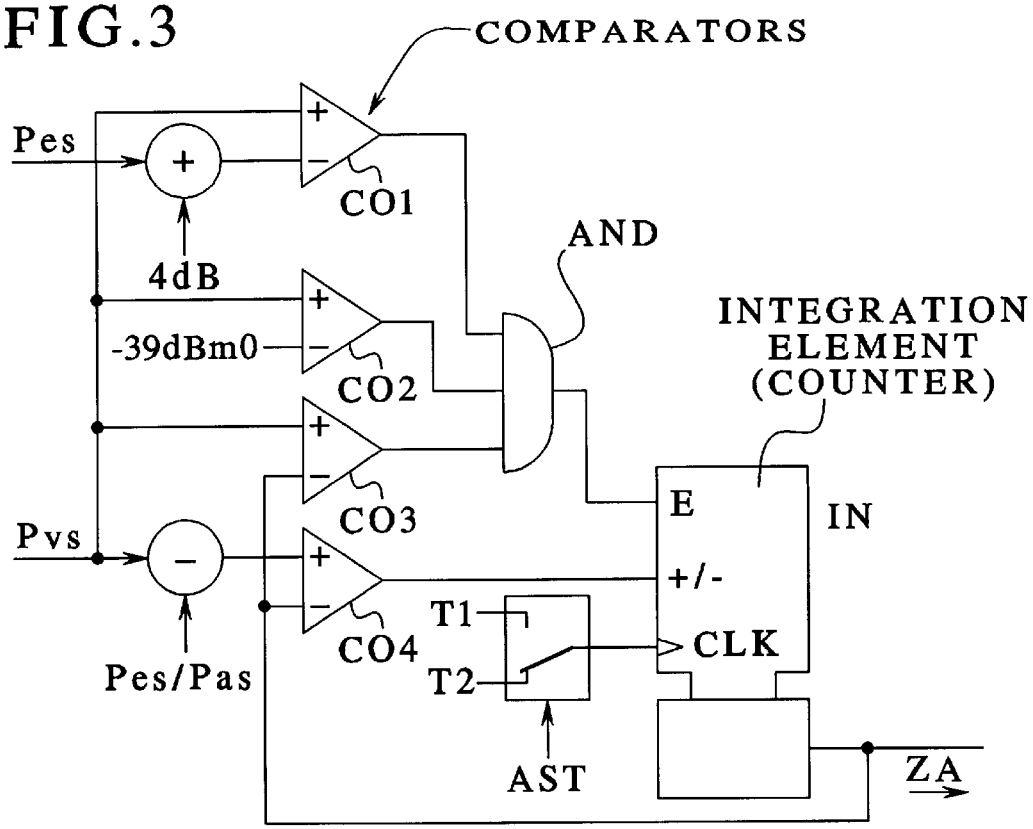
FIG. 3 shows an exemplary embodiment of an integration stage suitable for use in the control portion of FIG. 2.

In FIG. 3, a circuit is shown for monitoring these conditions, for the subtraction of two signals and subsequent integration. It contains one of the subtractors SUB2 or SUB3, and an integrator IN. The level conditions are monitored in comparators CO1 to CO3. By means of an AND logic gate AND, the attenuation measurement is enabled at the enable input E. The integrator IN smooths the result of the subtraction $P_{vs}-P_{es}$ or $P_{vs}-P_{as}$. A digital lowpass filter can be used as an integrator, however, it is also possible to use a up-down counter whose counting direction is controlled by the result of the comparison of the input signal with the emitted counter value (comparator CO4). If the counter value is smaller than the input level of the comparator CU4, counting takes place in the upward direction, and if the counter value is larger the counting is downward.

The comparator CO3 holds the counter fixed at its maximum value if the level $P_{vs}$ falls below the counter value of the attenuation. There are also standard variants that permit a slow decrease in the counter state. The integration elements are reset for each new connection.

The time constant of the integration element is switchable. This takes place by means of the application of two clock pulse signals with different frequencies: T1=2 kHz and TE2=31.25 Hz.

As already stated, the change in the filter coefficients is evaluated as a criterion for the conversion. Since in the present exemplary embodiment the auxiliary correlators exhibit very small auxiliary coefficients in the compensated state, and react more quickly than the correlators, the absolute values of the auxiliary coefficients can be evaluated directly. Each auxiliary coefficient is monitored for exceeding a threshold value S. If this occurs, the integration time is changed (i.e. shortened) via the OR gate OR. The interrogation of the auxiliary coefficients can of course also ensue sequentially.

Figure 2:
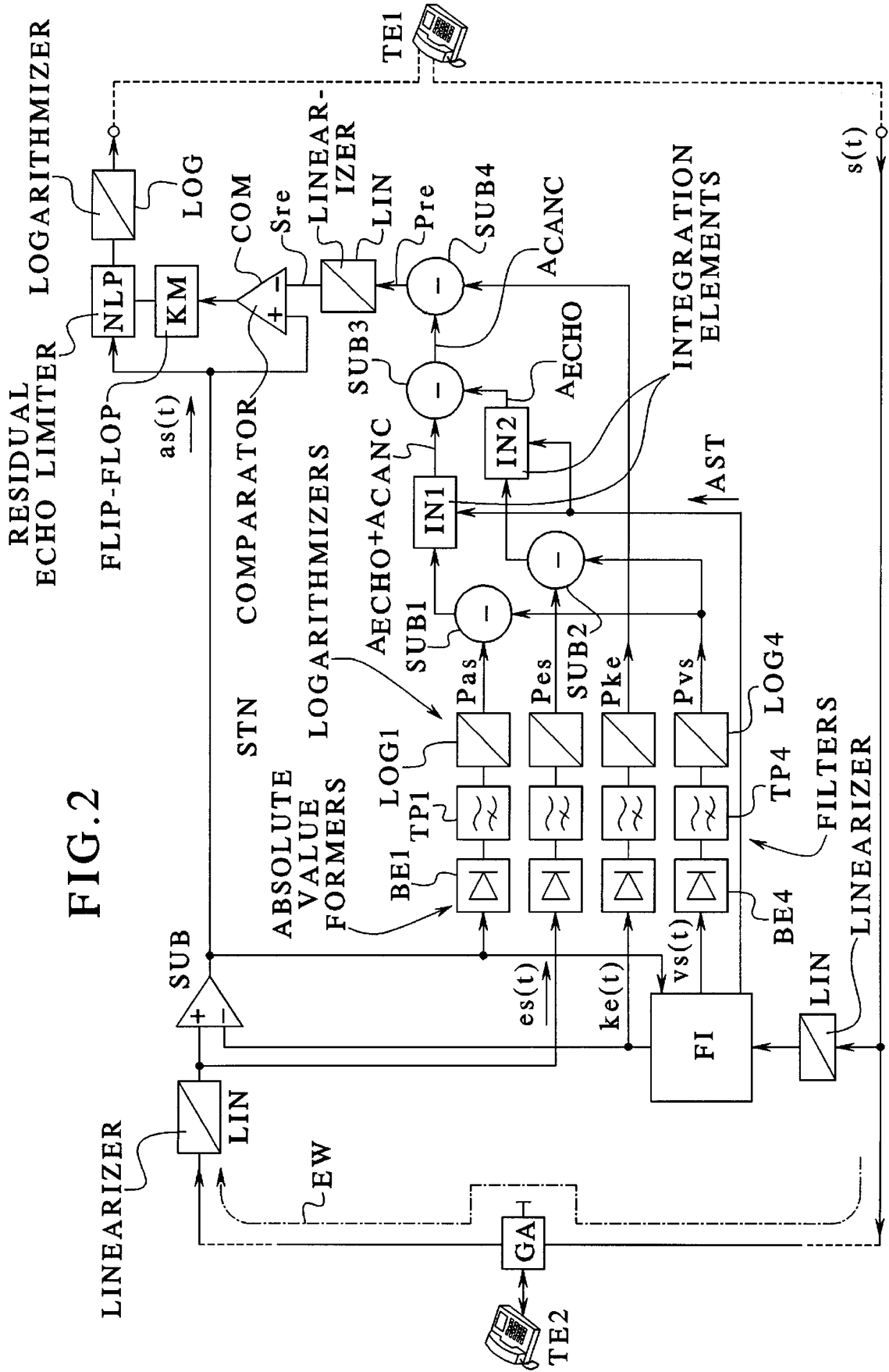
FIG. 2 is a schematic diagram of the control portion for the residual echo limiter (NLP) of FIG. 1.

In place of a lowpass filters TP1–TP4 subsequent logarithmizers LOG1–LOG4 for the processing of linear signals—as shown in FIG. 2, an alternative circuit for each filter-logarithmizer combination can be provided for processing the absolute value signals.

Figure 4:
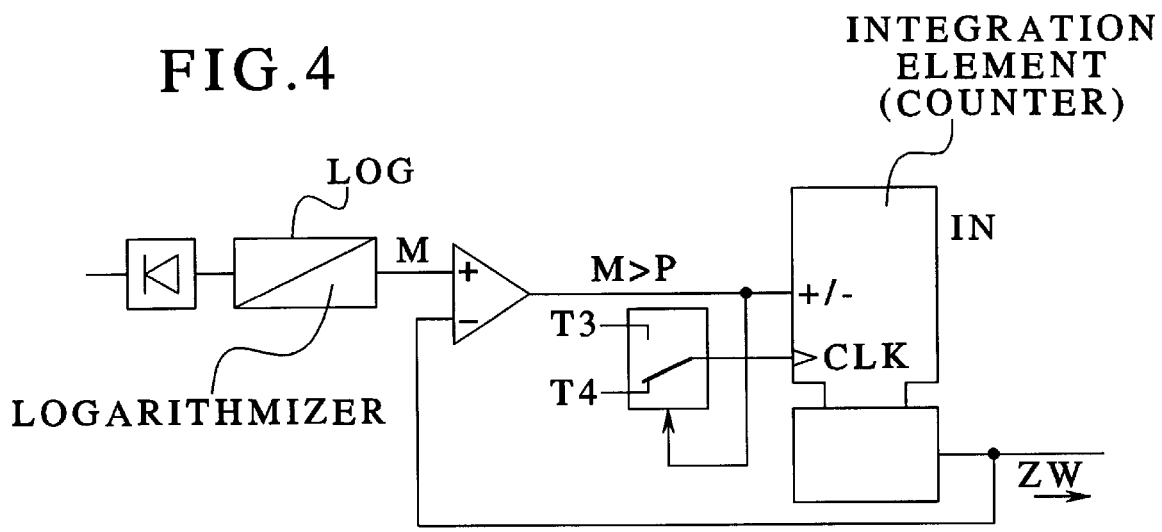
FIG. 4 shows a variant of the integration stage.

Such a circuit is shown in FIG. 4. As a lowpass filter, a counter that works as an integration means is again provided, which counts in the upward direction if the input signal M is greater than the counter value ZW, and counts in the downward direction if the input value is smaller than the counter value. Clock pulses T3 and T4 with different frequencies are used, e.g. T3=8 kHz for upward counting and T4=2 KHz for downward counting.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for limiting residual echo in a speech signal-carrying communication path having a subscriber at one end of said communication path, said subscriber producing an input signal into said communication path resulting in an output signal, an echo signal and a residual echo signal in said communication path, and said communication path containing a residual echo limiter, said method comprising the steps of:

generating a delay signal from said echo signal;

producing a correction signal using a filter having a plurality of controllable filter coefficients and correcting said output signal to compensate for echo signal using said correction signal;

filtering each of said input signal, said output signal, said echo signal and said delay signal in respective filter elements to produce filtered signals, said filter elements respectively having time constants;

producing a control signal from said filtered signals for actuating said residual echo limiter only when said input signal from said subscriber contains a speech component; and monitoring a monitored parameter which changes dependent on changes in a signal selected from the group of signals comprising said residual echo signal and said echo signal, and upon a change in said monitored parameter, temporarily reducing said time constants of said filter elements.

2. A method as claimed in claim 1 wherein the step of monitoring a monitored parameter comprises monitoring changes in the filter coefficients of the filter used for producing said correction signal, and upon a change in said filter coefficients exceeding a predetermined value, reducing said time constants of said filter elements.

3. A method as claimed in claim 1 wherein the step of producing a correction signal comprises producing a correction signal using a filter having a plurality of filter coefficients and a plurality of auxiliary coefficients, and comprising the additional steps of:

calculating said auxiliary coefficients from said transmission signal of said subscriber and from any remaining residual echo signal, said auxiliary coefficients becoming reduced as said residual echo signal becomes increasingly compensated by said correction signal; and monitoring absolute values of the respective auxiliary coefficients as said monitored parameter.

4. A method as claimed in claim 3 comprising the step of reducing said time constants if a sum of the absolute values of changes in said filter coefficients, or a sum of said auxiliary coefficients, exceeds a predetermined value.

5. A method as claimed in claim 3 comprising the step of:

reducing said time constants if a change in one of said filter coefficients or the absolute value of an auxiliary coefficient exceeds a predetermined value.

6. A method as claimed in claim 1 wherein the step of producing a control signal comprises:

converting said filtered signals into respective logarithmic values and obtaining attenuation values from said logarithmic values by subtracting respective pairs of said logarithmic values;

integrating said attenuation values to obtain a threshold value; and producing said control signal to actuate said residual echo limiter if said output signal exceeds threshold value.

7. A method as claimed in claim 1 wherein said subscriber comprises a first subscriber and wherein said communication path has a second subscriber connected thereto at an end of said communication path opposite said one end, said first and second subscribers respectively transmitting in opposite directions via said communication path and producing respective output signals in said opposite directions, said first subscriber comprising a remote subscriber and said second subscriber comprising a proximate subscriber, said method comprising the additional step of:

correcting said residual echo signal only if the output signal of said first subscriber exceeds a predetermined minimum level and only if said output signals respectively transmitted in said opposite directions in said communication path exhibit a predetermined level difference therebetween.

8. A method as claimed in claim 1 wherein each of said filter elements comprises an up/down counter and wherein the step of reducing said time constants comprises changing a count of said up/don counter.

9. An apparatus for limiting residual echo comprising:

a speech signal-carrying communication path having a subscriber at one end of said communication path, said subscriber producing an input signal into said communication path resulting in an output signal, an echo signal and a residual echo signal in said communication path;

a residual echo limiter in said communication path;

means for generating a delay signal from said echo signal;

means for producing a correction signal using a filter having a plurality of controllable filter coefficients and correcting output signal to compensate for said echo signal using said correction signal;

a plurality of filter elements in which said input signal, said output signal, said echo signal and said delay signal are respectively filtered to produce filtered signals, said filter elements respectively having time constants;

means for producing a control signal from said filtered signals for actuating said residual echo limiter only when a transmission signal from said subscriber contains a speech signal;

means for monitoring a monitored parameter which changes dependent on changes in a signal selected from the group of signals comprising said residual echo signal and said echo signal, and upon a change in said monitored parameter, for temporarily reducing said time constants of said filter elements.

10. An apparatus as claimed in claim 9 wherein said means for monitoring a monitored parameter comprises means for monitoring changes in the filter coefficients of the filter used for producing said correction signal, and upon a change in said filter coefficients exceeding a predetermined value, for reducing said time constants of said filter elements.

11. An apparatus as claimed in claim 9 wherein said means for producing a correction signal comprises means for producing a correction signal using a filter having a plurality of filter coefficients and a plurality of auxiliary coefficients, and said apparatus further comprising:

means for calculating said auxiliary coefficients from said transmission signal of said subscriber and from any remaining residual echo signal, said auxiliary coefficients becoming reduced as said residual echo signal becomes increasingly compensated by said correction signal; and means for monitoring absolute values of the respective auxiliary coefficients as said monitored parameter.

12. An apparatus as claimed in claim 11 further comprising means for reducing said time constants if a sum of the absolute values of changes in said filter coefficients, or a sum of said auxiliary coefficients, exceeds a predetermined value.

13. An apparatus as claimed in claim 11 further comprising:

means for reducing said time constants if a change in one of said filter coefficients or the absolute value of an auxiliary coefficient exceeds a predetermined value.

14. An apparatus as claimed in claim 9 wherein said means for producing a control signal comprises:

means for converting said filtered signals into respective logarithmic values and subtracting said logarithmic values in pairs to obtain attenuation values;

means for integrating said attenuation values to obtain a threshold value; and means for actuating said residual echo limiter if said output value exceeds said threshold value.

15. An apparatus as claimed in claim 9 wherein said subscriber comprises a first subscriber and wherein said communication path has a second subscriber connected thereto at an end of said communication path opposite said one end, said first and second subscribers respectively transmitting in opposite directions via said communication path and producing respective output signals in said opposite directions, said first subscriber comprising a remote subscriber and said second subscriber comprising a proximate subscriber, said apparatus further comprising:

means for correcting said residual echo signal only if the output signal of said first subscriber exceeds a predetermined minimum level and only if said output signals respectively transmitted in said opposite directions in said communication path exhibit a predetermined level difference therebetween.

16. An apparatus as claimed in claim 9 wherein each of said filter elements comprises an up/down counter.

* * * * *